US008412831B2

(12) United States Patent
Detrick et al.

(10) Patent No.: US 8,412,831 B2
(45) Date of Patent: Apr. 2, 2013

(54) PER PRIORITY TCP QUALITY OF SERVICE

(75) Inventors: Mark S. Detrick, Portland, OR (US); Robert Grant Engebretson, Medina, MN (US); Senthilkumar Narayanasamy, San Jose, CA (US); Benjamin Patrick Hart, Champlin, MN (US)

(73) Assignee: Brocade Communications Systems, Inc., San Jose, CA (US)

( * ) Notice: Subject to any disclaimer, the term of this patent is extended or adjusted under 35 U.S.C. 154(b) by 201 days.

(21) Appl. No.: 12/534,457

(22) Filed: Aug. 3, 2009

(65) Prior Publication Data
US 2011/0029676 A1 Feb. 3, 2011

(51) Int. Cl.
G06F 15/16 (2006.01)
H04B 7/00 (2006.01)
H04W 4/00 (2009.01)
H04L 12/28 (2006.01)
H04L 12/56 (2006.01)

(52) U.S. Cl. ........ 709/227; 709/228; 709/229; 370/310; 370/327; 370/340; 370/392; 370/395.52

(58) Field of Classification Search .................. 709/227, 709/228, 229
See application file for complete search history.

(56) References Cited

U.S. PATENT DOCUMENTS

| | | | |
|---|---|---|---|
| 4,782,483 A | 11/1988 | Lambert et al. | |
| 5,282,202 A | 1/1994 | Bernstein et al. | |
| 5,383,181 A | 1/1995 | Aramaki | |
| 5,425,020 A | 6/1995 | Gregg et al. | |
| 5,455,831 A | 10/1995 | Bartow et al. | |
| 5,519,695 A | 5/1996 | Purohit et al. | |
| 5,649,108 A | 7/1997 | Spiegel et al. | |
| 5,649,110 A | 7/1997 | Ben-Nun et al. | |
| 5,991,302 A * | 11/1999 | Berl et al. ................. | 370/400 |
| 6,016,310 A | 1/2000 | Muller et al. | |
| 6,104,696 A | 8/2000 | Kadambi et al. | |
| 6,104,700 A | 8/2000 | Haddock et al. | |

(Continued)

FOREIGN PATENT DOCUMENTS

| | | |
|---|---|---|
| EP | 465090 A1 | 1/1992 |
| WO | 9319550 A1 | 9/1993 |
| WO | 9807259 A1 | 2/1998 |
| WO | WO02075535 A1 | 9/2002 |

OTHER PUBLICATIONS

Braden et al., Integrated Services in the Internet Architecture: an Overview, Network Working Group, RFC 1633, Jul. 1994, 28 pages.

(Continued)

Primary Examiner — Kevin Bates
Assistant Examiner — Mohammed Ahmed
(74) Attorney, Agent, or Firm — Wong, Cabello, Lutsch, Rutherford & Brucculeri LLP

(57) ABSTRACT

An IP gateway device establishes distinct TCP sessions within a single FCIP tunnel, each TCP session being designated for a different priority of service (e.g., high, medium, low), plus a control stream. Each TCP session has its own TCP stack and its own settings for VLAN Tagging (IEEE 802.1Q), quality of service (IEEE 802.1P) and Differentiated Services Code Point (DSCP). By distributing data streams assigned to different priorities of service into different TCP sessions within the FCIP tunnel, an IP gateway device can preserve the distinctions between the data stream priorities while the data traffic is within the IP network.

30 Claims, 4 Drawing Sheets

U.S. PATENT DOCUMENTS

| | | | |
|---|---|---|---|
| 6,233,236 | B1 | 5/2001 | Nelson et al. |
| 6,240,096 | B1 | 5/2001 | Book |
| 6,275,492 | B1 | 8/2001 | Zhang |
| 6,400,681 | B1 | 6/2002 | Bertin et al. |
| 6,434,145 | B1 | 8/2002 | Opsasnick et al. |
| 6,532,212 | B1 | 3/2003 | Soloway et al. |
| 6,549,541 | B1 | 4/2003 | Sainio et al. |
| 6,628,609 | B2 | 9/2003 | Chapman et al. |
| 6,647,017 | B1 | 11/2003 | Heiman |
| 6,678,248 | B1 | 1/2004 | Haddock et al. |
| 6,731,600 | B1 | 5/2004 | Patel et al. |
| 6,859,438 | B2 | 2/2005 | Haddock et al. |
| 6,865,153 | B1 | 3/2005 | Hill et al. |
| 7,447,198 | B1 | 11/2008 | Banks et al. |
| 2001/0043609 | A1* | 11/2001 | Chapman et al. ............ 370/401 |
| 2002/0131456 | A1 | 9/2002 | Lin et al. |
| 2003/0084219 | A1* | 5/2003 | Yao et al. ...................... 710/300 |
| 2003/0165137 | A1* | 9/2003 | Soloway et al. ............. 370/389 |
| 2003/0172149 | A1 | 9/2003 | Edsall et al. |
| 2004/0111605 | A1* | 6/2004 | Weber ........................... 713/152 |
| 2004/0146063 | A1* | 7/2004 | Golshan et al. ............... 370/428 |
| 2005/0005024 | A1* | 1/2005 | Samuels et al. ............... 709/238 |
| 2005/0030948 | A1 | 2/2005 | Wyatt |
| 2005/0094649 | A1 | 5/2005 | Varanasi et al. |
| 2005/0111455 | A1* | 5/2005 | Nozue et al. .................. 370/392 |
| 2005/0152369 | A1 | 7/2005 | Ambe et al. |
| 2005/0169258 | A1 | 8/2005 | Millet et al. |
| 2005/0198523 | A1 | 9/2005 | Shanbhag et al. |
| 2006/0034302 | A1* | 2/2006 | Peterson ....................... 370/401 |
| 2007/0118665 | A1* | 5/2007 | Philbrick et al. .............. 709/230 |
| 2007/0130295 | A1 | 6/2007 | Rastogi et al. |
| 2007/0140250 | A1* | 6/2007 | McAllister et al. ........... 370/392 |

OTHER PUBLICATIONS

Floyd, et al., Link-sharing and Resource Management Models for Packet Networks, IEEE/ACM Transactions on Networking, vol. 3, No. 4, Aug. 1995, 22 pages.

"Fabric Shortest Path First Version 2" by Brocade Communication Systems, Inc. Revision 0.2, May 23, 2000.

American National Standard for Information Systems, "Fibre Channel Fabric Generic Requirements (FC-FG) Rev. 3.5," Aug. 7, 1996.

Increasing Intelligence within the SAN fabric, Internet Citation, Jun. 2001, XP002251362, Retrieved from the Internet Aug. 14, 2003: URL:http://www.brocade.com/san/white_papers/pdf/IncreadingIntelligenceWithinSAN.pdf.

Supplementary European Search Report for EP 02747985, dated Nov. 2, 2006, 4 pages.

XP-001031957: "A Reliable and Scalable Striping Protocol," Adiseshu, Hari, et al., Computer Communication Review, ACM, vol. 26, No. 4, Oct. 1996, ISSN: 0146-4833, NY, US, pp. 131-141.

Storage Channel News: A case for remote data replication, Rosenstein, Ariel, Sep. 28, 2006, ArticleAlley.com, 3 pages, http://searchstoragechannel.techtarget.com/news/article/0,289142,sid98_gci1219253,00.html.

Overland Storage, Data Replication, 2 pages, http://www.overlandstorage.com/topics/Replication.html, Feb. 27, 2009.

Dell Tape: Backup With Custom Barcodes, 4 pages, http://searchdatabackup.techtarget.com/generic/0,295582,sid187_gci1300168,00.html, Feb. 27, 2009.

Deficit Round Robin, 1 page, http://en.wikipedia.org/wiki/deficit_weighted_round_robin, Mar. 9, 2009.

IEEE 802.1p, 1 page, http://en.wikipedia.org/wiki/IEEE_802.1p, Mar. 9, 2009.

IEEE 802.1Q, 3 pages, http://en.wikipedia.org/wiki/IEEE_802.1Q, Mar. 9, 2009.

Differentiated services, 7 pages, http://en.wikipedia.org/wiki/Differentiated_services, Mar. 9, 2009.

I am 19374: Chapter 2: Virtual LANs and VLAN Trunking, 6 pages, http://ooteum.blogspot.com/2008/12/chapter-2-virtual-lans-and-vlan.html, Mar. 9, 2009.

TCP Session: Chapter 6, http://74.125.47.132/search?q=cache:tlPkqJqtWSAJ:research.microsoft.com/en-us/um/people/padmanab/thesis/session.ps.gz+%22TCP+SESSION%22+%22CHAPTER+6%22+%22PROS+AND+CONS%22&cd=1&hl=en&ct=clnk&gl=us&client=firefox-a, pp. 96-129, 1998.

* cited by examiner

PER PRIORITY TCP QUALITY OF SERVICE

BACKGROUND

A storage area network (SAN) may be implemented as a high-speed, special purpose network that interconnects different kinds of data storage devices with associated data servers on behalf of a large network of users. Typically, a storage area network includes high performance switches as part of the overall network of computing resources for an enterprise. The storage area network is usually clustered in close geographical proximity to other computing resources, such as mainframe computers, but may also extend to remote locations for backup and archival storage using wide area network carrier technologies. Fibre Channel networking is typically used in SANs although other communications technologies may also be employed, including Ethernet and IP-based storage networking standards (e.g., iSCSI, FCIP (Fibre Channel over IP), etc.).

As used herein, the term "Fibre Channel" refers to the Fibre Channel (FC) family of standards (developed by the American National Standards Institute (ANSI)) and other related and draft standards. In general, Fibre Channel defines a transmission medium based on a high speed communications interface for the transfer of large amounts of data via connections between varieties of hardware devices.

FC standards have defined limited allowable distances between FC switch elements. Fibre Channel over IP (FCIP) refers to mechanisms that allow the interconnection of islands of FC SANs over IP-based (internet protocol-based) networks to form a unified SAN in a single FC fabric, thereby extending the allowable distances between FC switch elements to those allowable over an IP network. For example, FCIP relies on IP-based network services to provide the connectivity between the SAN islands over local area networks (LANs), metropolitan area networks (MANs), and wide area networks (WANs). Accordingly, using FCIP, a single FC fabric can connect physically remote FC sites allowing remote disk access, tape backup, and live mirroring.

In an FCIP implementation, FC traffic is carried over an IP network through a logical FCIP tunnel. Each FCIP entity on either side of the IP network works at the session layer of the OS model. The FC frames from the FC SANs are encapsulated in IP packets and transmission control protocol (TCP) segments and transported in accordance with the TCP layer in a single TCP session. For example, an FCIP tunnel is created over the IP network and a TCP session is opened in the FCIP tunnel. All traffic is then communicated through the FCIP tunnel in the same TCP session.

Different priorities may be assigned to different FC data streams to provide different levels of quality of service (QoS). For example, a video data stream may be given a higher priority than a tape backup data stream, which is not as sensitive to performance problems or to the inherent delays in reordering packets that have arrived out-of-order. However, by passing FCIP traffic through a single TCP session, all levels of service are similarly affected during IP network congestion. As such, all FCIP traffic in the FCIP tunnel is effectively treated with the same level of priority. In this implementation, FC data streams having different levels of priority (e.g., different qualities of service or QoS levels) may lose their distinct priorities while in the IP network.

SUMMARY

Implementations described and claimed herein address the foregoing problems by establishing distinct TCP sessions within a single FCIP tunnel, each TCP session being designated for a different priority of service (e.g., high, medium, low), plus a control stream. Each TCP session has its own TCP stack and its own settings for VLAN Tagging (IEEE 802.1Q), quality of service (IEEE 802.1P) and Differentiated Services Code Point (DSCP). By distributing data streams assigned to different priorities of service into different TCP sessions within the FCIP tunnel, an IP gateway device (e.g. an FCIP extension device) can preserve the distinctions between the data stream priorities while the data traffic is within the IP network.

Other implementations are also described and recited herein.

DETAILED DESCRIPTIONS

Figure 1:
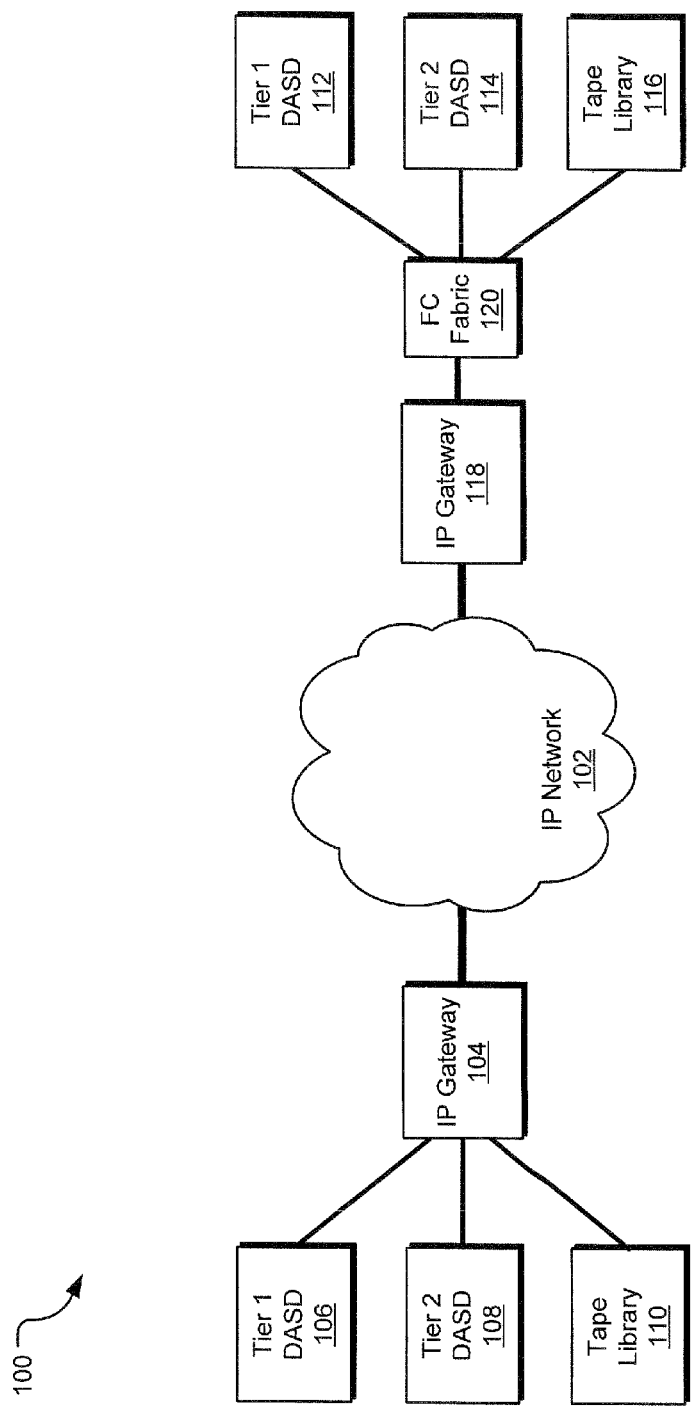
FIG. 1 illustrates an example FCIP configuration using distinct per-priority TCP sessions within a single FCIP tunnel over an IP network.

FIG. 1 illustrates an example FCIP configuration 100 using distinct per-priority TCP sessions within a single FCIP tunnel over an IP network 102. An IP gateway device 104 (e.g., an FCIP extender), couples example FC source nodes (e.g., Tier 1 Direct Access Storage Device (DASD) 106, Tier 2 DASD 108, and a tape library 110) to the IP network 102 for communication to example FC destination nodes (e.g., Tier 1 DASD 112, Tier 2 DASD 114, and a tape library 116, respectively) through an IP gateway device 118 (e.g., another FCIP extender) and an FC fabric 120. Generally, an IP gateway device interfaces to an IP network. In the specific implementation illustrated in FIG. 1, the IP gateway device 118 interfaces between an IP network and an FC fabric, but other IP gateway devices may include tape extension devices, Ethernet network interface controllers (NICs), host bus adapters (HBAs), and director level switches). An example application of such an FCIP configuration would be a remote data replication (RDR) scenario, wherein the data on the Tier 1 DASD 106 is backed up to the remote Tier 1 DASD 112 at a high priority, the data on the Tier 2 DASD 108 is backed up to the remote Tier 2 DASD 114 at a medium priority, and data on the tape library 110 is backed up to the remote tape library 116 at a low priority. In addition to the data streams, a control stream is also communicated between the IP gateway devices 104 and 118 to pass class-F control frames.

The IP gateway device 104 encapsulates FC packets received from the source nodes 106, 108, and 110 in TCP segments and IP packets and forwards the TCP/IP-packet-encapsulated FC frames over the IP network 102. The IP gateway device 118 receives these encapsulated FC frames from the IP network 102, "de-encapsulates" them (i.e., extracts the FC frames from the received IP packets and TCP segments), and forwards the extracted FC frames through the FC fabric 120 to their appropriate destination nodes 112, 114, and 116. It should be understood that each IP gateway device 104 and 118 can perform the opposite role for traffic going in the opposite direction (e.g., the IP gateway device 118 doing the encapsulating and forwarding through the IP network 102 and the IP gateway device 104 doing the de-encapsulating and forwarding the extracted FC frames through an FC fabric). In other configurations, an FC fabric may or may not exist on either side of the IP network 102. As such, in such other configurations, at least one of the IP gateway devices 104 and 118 could be a tape extender, an Ethernet NIC, etc.

Each IP gateway device 104 and 118 includes an IP interface, which appears as an end station in the IP network 102. Each IP gateway device 104 and 118 also establishes a logical FCIP tunnel through the IP network 102. The IP gateway devices 104 and 118 implement the FCIP protocol and rely on the TCP layer to transport the TCP/IP-packet-encapsulated FC frames over the IP network 102. Each FCIP tunnel between two IP gateway devices connects two TCP end points in the IP network 102. Viewed from the FC perspective, pairs of switches export virtual E_PORTs or virtual EX_PORTs (collectively referred to as virtual E_PORTs) that enable forwarding of FC frames between FC networks, such that the FCIP tunnel acts as an FC InterSwitch Link (ISL) over which encapsulated FC traffic flows.

The FC traffic is carried over the IP network 102 through the FCIP tunnel between the IP gateway device 104 and the IP gateway device 118 in such a manner that the FC fabric 102 and all purely FC devices (e.g., the various source and destination nodes) are unaware of the IP network 102. As such, FC datagrams are delivered in such time as to comply with applicable FC specifications.

To accommodate multiple levels of priority, the IP gateway devices 104 and 118 create distinct TCP sessions for each level of priority supported, plus a TCP session for a class-F control stream. In one implementation, low, medium, and high priorities are supported, so four TCP sessions are created between the IP gateway devices 104 and 118, although the number of supported priority levels and TCP sessions can vary depending on the network configuration. The control stream and each priority stream is assigned its own TCP session that is autonomous in the IP network 102, getting its own TCP stack and its own settings for VLAN Tagging (IEEE 802.1Q), quality of service (IEEE 802.1P) and Differentiated Services Code Point (DSCP). Furthermore, the traffic flow in each per priority TCP session is enforced in accordance with its designated priority by an algorithm, such as but not limited to a deficit weighted round robin (DWRR) scheduler. All control frames in the class-F TCP session are strictly sent on a per service interval basis.

Figure 2:
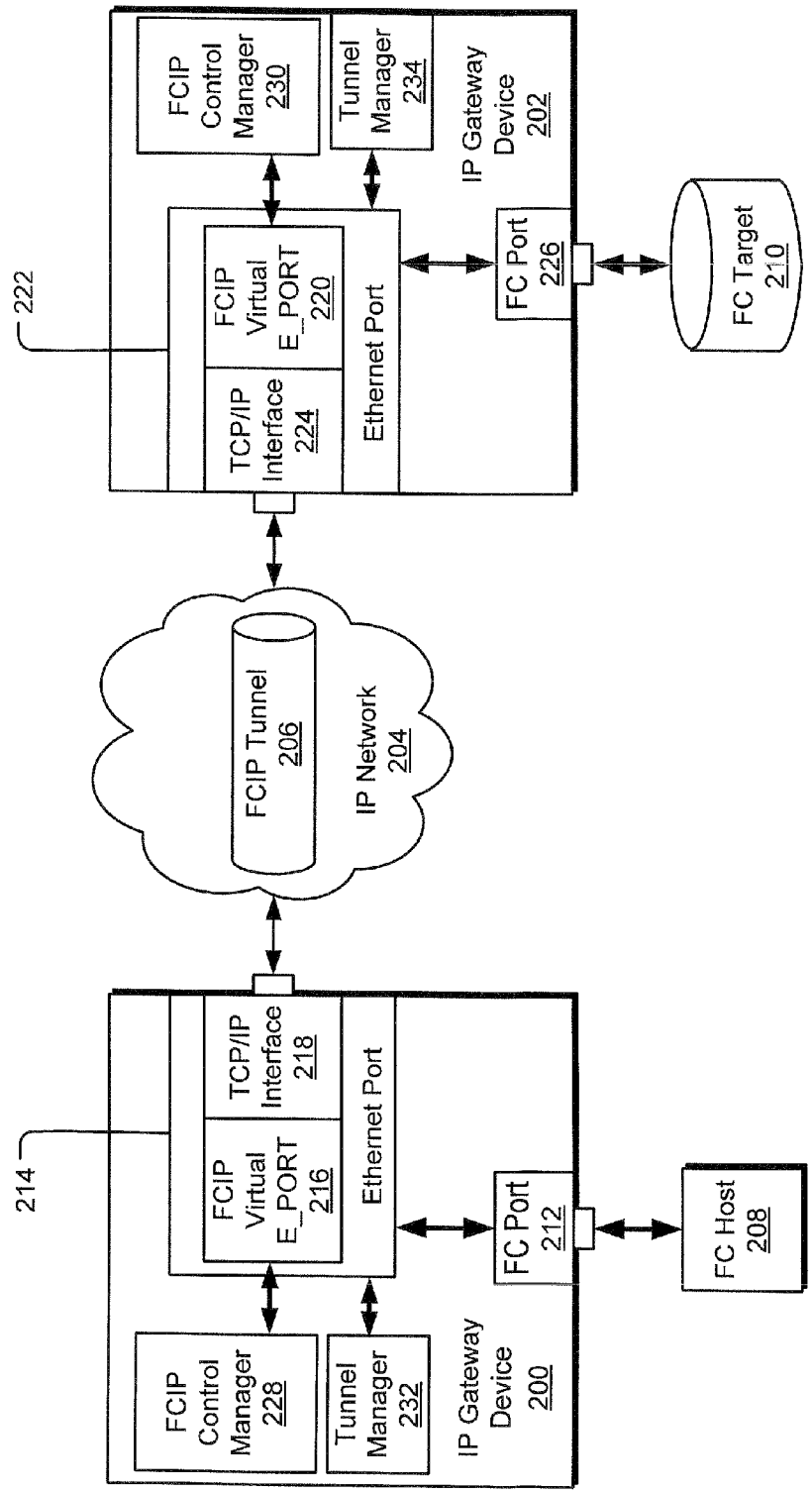
FIG. 2 illustrates example IP gateway devices communicating over an IP network using distinct per priority TCP sessions within a single FCIP.

FIG. 2 illustrates example IP gateway devices 200 and 202 (e.g., FCIP extension devices) communicating over an IP network 204 using distinct per priority TCP sessions within a single FCIP tunnel 206. An FC host 208 is configured to send data to an FC target 210 through the IP network 204. It should be understood that other data streams between other FC source devices (not shown) and FC target devices (not shown) can be communicated at various priority levels over the IP network 204.

The FC host 208 couples to an FC port 212 of the IP gateway device 200. The coupling may be made directly between the FC port 212 and the FC host 208 or indirectly through an FC fabric (not shown). The FC port 212 receives FC frames from the FC host 208 and forwards them to an Ethernet port 214, which includes an FCIP virtual E_PORT 216 and a TCP/IP interface 218 coupled to the IP network 204. The FCIP virtual E_PORT 216 acts as one side of the logical ISL formed by the FCIP tunnel 206 over the IP network 204. An FCIP virtual E_PORT 220 in the IP gateway device 202 acts as the other side of the logical ISL. The Ethernet port 214 encapsulates each FC frame received from the FC port 212 in a TCP segment belonging to the TCP session for the designated priority and an IP packet shell and forwards them over the IP network 204 through the FCIP tunnel 206.

The FC target 210 couples to an FC port 226 of the IP gateway device 202. The coupling may be made directly between the FC port 226 and the FC host 210 or indirectly through an FC fabric (not shown). An Ethernet port 222 receives TCP/IP-packet-encapsulated FC frames over the IP network 204 from the IP gateway device 200 via a TCP/IP interface 224. The Ethernet port 222 de-encapsulates the received FC frames and forwards them to an FC port 226 for communication to the FC target device 210.

It should be understood that data traffic can flow in either direction between the FC host 208 and the FC target 210. As such, the roles of the IP gateway devices 200 and 202 may be swapped for data flowing from the FC target 210 and the FC host 208.

Tunnel manager modules 232 and 234 (e.g., circuitry, firmware, software or some combination thereof) of the IP gateway devices 200 and 202 set up and maintain the FCIP tunnel 206. Either IP gateway device 200 or 202 can initiate the FCIP tunnel 206, but for this description, it is assumed that the IP gateway device 200 initiates the FCIP tunnel 206. After the Ethernet ports 214 and 222 are physically connected to the IP network 204, data link layer and IP initialization occur. The TCP/IP interface 218 obtains an IP address for the IP gateway device 200 (the tunnel initiator) and determines the IP address and TCP port numbers of the remote IP gateway device 202. The FCIP tunnel parameters may be configured manually, discovered using Service Location Protocol Version 2 (SLPv2), or designated by other means. The IP gateway device 200, as the tunnel initiator, transmits an FCIP Special Frame (FSF) to the remote IP gateway device 202. The FSF contains the FC identifier and the FCIP endpoint identifier of the IP gateway device 200, the FC identifier of the remote IP gateway device 202, and a 64-bit randomly selected number that uniquely identifies the FSF. The remote IP gateway device 202 verifies that the contents of the FSF match its local configuration. If the FSF contents are acceptable, the unmodified FSF is echoed back to the (initiating) IP gateway device 200. After the IP gateway device 200 receives and verifies the FSF, the FCIP tunnel 206 can carry encapsulated FC traffic.

The TCP/IP interface 218 creates multiple TCP sessions through the single FCIP tunnel 206. In the illustrated implementation, three or more TCP sessions are created in the single FCIP tunnel 206. One TCP connection is designated to carry control data (e.g., class-F data), and the remaining TCP sessions are designated to carry data streams having different levels of priority. For example, considering a three priority QoS scheme, four TCP sessions are created in the FCIP tunnel 206 between the IP gateway device 200 and the IP gateway device 202, one TCP session designated for control data, and the remaining TCP sessions designated for high, medium, and low priority traffic, respectively. Note: It should be understood that multiple TCP sessions designated with the same level of priority may also be created (e.g., two high priority TCP sessions) within the same FCIP tunnel.

The FCIP tunnel 206 maintains frame ordering within each priority TCP flow. The QoS enforcement engine may alter the egress transmission sequence of flows relative to their ingress sequence based on priority. However, the egress transmission sequence of frames within an individual flow will remain in the same order as their ingress sequence to that flow. Because the flows are based on FC initiator and FC target, conversational frames between two FC devices will remain in proper sequence. A characteristic of TCP is to maintain sequence order of bytes transmitted before deliver to upper layer protocols. As such, the IP gateway device at the remote end of the FCIP tunnel 206 is responsible for reordering data frames received from the various TCP sessions before sending them up the communications stack to the FC application layer. Furthermore, in one implementation, each TCP session can service as a backup in the event a lower (or same) priority TCP session fails. Each TCP session can be routed and treated independently of others via autonomous settings for VLAN and Priority Tagging and/or DSCP.

In addition to setting up the FCIP tunnel 206, the IP gateway device 200 may also set up TCP trunking through the FCIP tunnel 206. TCP trunking allows the creation of multiple FCIP circuits within the FCIP tunnel 206, with each FCIP circuit connecting a source-destination IP address pair. In addition, each FCIP circuit can maintain multiple TCP sessions, each TCP session being designated for different priorities of service. As such, each FCIP circuit can have different attributes, such as IP addresses, committed rates, priorities, etc., and can be defined over the same Ethernet port or over different Ethernet ports in the IP gateway device. The trunked FCIP circuits support load leveling and provide failover paths in the event of a network failure, while maintaining in-order delivery. For example, if one FCIP circuit in the TCP trunk fails or becomes congested, data can be redirected to a same-priority TCP session of another FCIP circuit in the FCIP tunnel 206. The IP gateway device 202 receives the TCP/IP-packet-encapsulated FC frames and reconstitutes the data streams in the appropriate order through the FCIP virtual E_PORT 220.

Each IP gateway device 200 and 202 includes an FCIP control manager (see FCIP control managers 228 and 230), which generate the class-F control frames for the control data stream transmitted through the FCIP tunnel 206 to the FCIP control manager in the opposing IP gateway device. Class-F traffic is connectionless and employs acknowledgement of delivery or failure of delivery. Class-F is employed with FC switch expansion ports (E_PORTS) and is applicable to the IP gateway devices 200 and 202, based on the FCIP virtual E_PORT 216 and 220 created in each IP gateway device. Class-F control frames are used to exchange routing, name service, and notifications between the IP gateway devices 200 and 202, which join the local and remote FC networks into a single FC fabric. However, the described technology is not limited to combined single FC fabrics and is compatible with FC routed environments.

The IP gateway devices 200 and 202 emulate raw FC ports (e.g., VE_PORTs or VEX_PORTs) on both of the FCIP tunnel 206. For FC I/O data flow, these emulated FC ports support ELP (Exchange Link Parameters), EFP (Exchange Fabric Parameters, and other FC-FS (Fibre Channel-Framing and Signaling) and FC-SW (Fibre Channel-Switched Fabric) protocol exchanges to bring the emulated FC E_PORTs online. After the FCIP tunnel 206 is configured and the TCP sessions are created for an FCIP circuit in the FCIP tunnel 206, the IP gateway devices 200 and 202 will activate the logical ISL over the FCIP tunnel 206. When the ISL has been established, the logical FC ports appear as virtual E_PORTs in the IP gateway devices 200 and 202. For FC fabric services, the virtual E_PORTs emulate regular E_PORTs, except that the underlying transport is TCP/IP over an IP network, rather than FC in a normal FC fabric. Accordingly, the virtual E_PORTs 216 and 220 preserve the "semantics" of an E_PORT.

Figure 3:
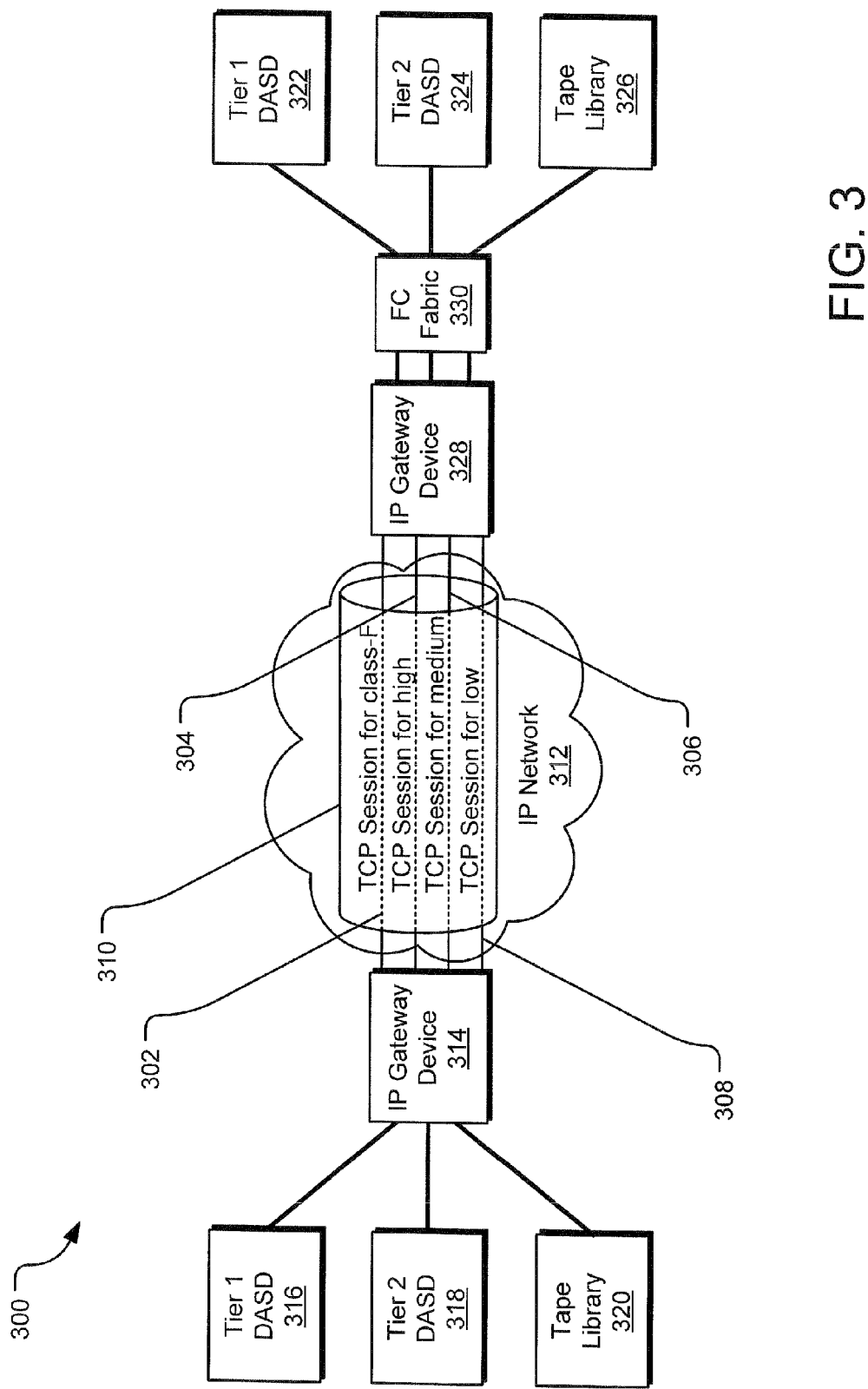
FIG. 3 illustrates an example FCIP configuration showing distinct per priority TCP sessions within a single FCIP tunnel over an IP network.

FIG. 3 illustrates an example FCIP configuration 300 showing distinct per priority TCP sessions 302, 304, 306, and 308 within a single FCIP tunnel 310 over an IP network 312. An IP gateway device 314 (e.g., an FCIP extender) couples example FC source nodes (e.g., Tier 1 Direct Access Storage Device (DASD) 316, Tier 2 DASD 318, and a tape library 320) to the IP network 312 for communication to example FC destination nodes (e.g., Tier 1 DASD 322, Tier 2 DASD 324, and a tape library 326, respectively) through an IP gateway device 328 (e.g., an FCIP extender) and an FC fabric 330. An example application of such an FCIP configuration would be a remote data replication (RDR) scenario, wherein the data on the Tier 1 DASD 316 is backed up to the remote Tier 1 DASD 322 at a high priority, the data on the Tier 2 DASD 318 is backed up to the remote Tier 2 DASD 324 at a medium priority, and data on the table library 320 is backed up to the remote tape library 326 at a low priority.

Within the single FCIP tunnel 310, individual TCP sessions are created between the source IP address (e.g., of the IP gateway device 314) and the destination IP address (e.g., of the IP gateway device 328). Each data stream of a certain priority is designated for a particular TCP session in the FCIP tunnel 310. In addition to the prioritized data streams 304, 306, and 308, a control stream 302 is also provided between the IP gateway devices 314 and 328 to pass class-F control frames.

In one implementation, operating at the media access controller (MAC) level, data frames are designated with a priority in accordance with IEEE 802.1p, although other priority schemes may be supported. In IEEE 802.1p, a 3-bit Priority Code Point in the IEEE 802.1Q frame header indicates the frame priority level from 0 (lowest) to 7 (highest). In an alternative implementation, at the IP level, bits set in the DSCP field of the IP packet header identify the priority of the packet, such that the IP gateway device can distribute the data frames to the TCP sessions appropriate for their identified priorities. Furthermore, it should be understood that the FCIP tunnel 310 many include multiple FCIP circuits in a TCP trunked configuration, with each FCIP circuit maintaining multiple TCP sessions.

Figure 4:
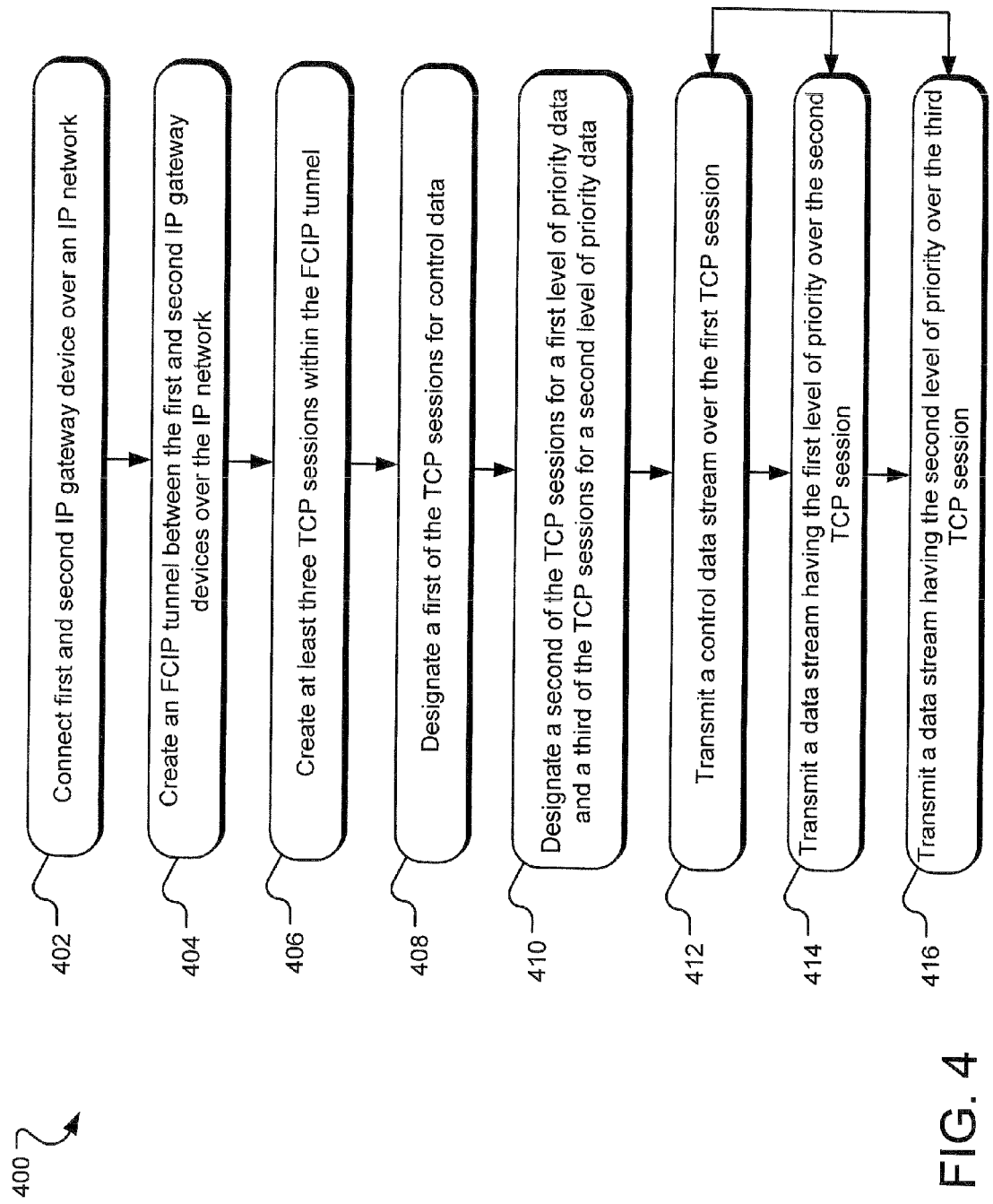
FIG. 4 illustrates example operations for communicating data having different levels of priority of service between a first FC network and a second FC network over an IP network.

FIG. 4 illustrates example operations for communicating data having different levels of priority of service between a first FC network and a second FC network over an IP network. A connecting operation 402 connects a first IP gateway device (e.g., an FCIP extension device, etc.) to a second IP gateway device over the IP network. Each IP gateway device supports its own FC network, which communicates across the IP network using an FCIP tunnel. It should also be understood that each IP gateway device may also support multiple FC networks, such as using Virtual Fabric (VF) technology.

A tunnel operation 404 initiates creation of the FCIP tunnel between the first and second IP gateway devices over the IP network. In one implementation, one of the IP gateway devices acts as a tunnel initiator and obtains an IP address. In many implementations, the source and destination IP addresses are manually configured at each end of the FCIP tunnel, although other designations of IP address are contemplated (e.g., allocation from an IP address service). The source IP address is that of the TCP/IP interface in the transmitting IP gateway device, and the destination IP address is that of the TCP/IP interface in the receiving IP gateway device. For example, the source and destination IP addresses may be retrieved from storage in the transmitting device. Typically, the destination address is learned by the transmitting device from a routing table or from a previously received frame and stored in association with the communication flow between the two devices.

The tunnel initiator then determines the IP address and the TCP port numbers of the remote IP gateway device on the other side of the tunnel. The FCIP tunnel parameters may be configured manually, discovered using Service Location Protocol Version 2 (SLPv2), or designated by other means. The tunnel initiator transmits an FCIP Special Frame (FSF) to the remote IP gateway device. The FSF contains the FC identifier and the FCIP endpoint identifier of the tunnel initiator, the FC identifier of the remote IP gateway device, and a 64-bit randomly selected number that uniquely identifies the FSF. The remote IP gateway device verifies that the contents of the FSF match its local configuration. If the FSF contents are acceptable, the unmodified FSF is echoed back to the tunnel initiator. After the tunnel initiator receives and verifies the FSF, the FCIP tunnel can carry encapsulated FC traffic.

A session operation 406 initiates creation of at least three TCP sessions within the FCIP tunnel. In one implementation, a three step handshake may be employed to create a TCP session. Before a session initiator attempts to establish a TCP session with a remote device, the remote device first binds to a port to open the port up for connections (called a "passive open"). Once the passive open is established, the session initiator may initiate an active open to establish the TCP session:

The active open is performed by the session initiator by sending a SYN to the remote device.
In response, the remote device replies with a SYN-ACK.
Then, the session initiator sends an ACK back to the remote device.

At this point, both the session initiator and remote have received an acknowledgment of the connection. The creation operation 406 may also include formation of a TCP trunk within the FCIP tunnel, with the TCP trunk including multiple FCIP circuits for each FCIP tunnel, each FCIP tunnel maintaining multiple TCP sessions for control and QoS of data.

A control operation 408 designates one of the TCP session for class-F control data. A data operation 410 designates one of the TCP sessions for a first priority of service (e.g., low) and another of the TCP session as a second priority of service (e.g., high). In a typical scenario, three different priorities of service are supported, but this typical scenario should not be limiting. Operations 408 and 410 may occur sequentially, concurrently, or in the order shown in FIG. 4.

Transmission operations 412, 414, and 416 can occur in any order or concurrently. The transmission operations 412, 414, and 416 designate the different priorities of data and the control data to different TCP sessions for transmission. For example, in one implementation, the transmission operations 412, 414, and 415 direct the data for the different priorities of data and the control data to the different TCP sessions. The transmission operation 412 then transmits a control data stream over the first TCP session, which is designated for class-F control data. The transmission operation 414 then transmits a data stream having a first level of priority of service (e.g., high) over the second TCP session. The transmission operation 416 then transmits a data stream having a second level of priority of service (e.g., low) over the third TCP session. Further, it would be typical to support at least a third level of priority of service (e.g., medium) over a fourth TCP session within the FCIP tunnel, although there is no requirement for three levels of priority.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   initiating creation of a tunnel over an Internet Protocol (IP) network;
   initiating creation of a TCP trunk containing two or more Fibre Channel over IP (FCIP) circuits in the tunnel; and
   initiating creation, in each of the FCIP circuits, of at least two Transport Control Protocol (TCP) sessions for data transmission through the tunnel, wherein data having a first priority of service is designated for transmission over a first of the TCP sessions and data having a second priority of service is designated for transmission over a second of the TCP sessions.

2. The method of claim 1 further comprising:
   transmitting the data having the first priority of service over the first TCP session; and
   transmitting the data having the second priority of service over the second TCP session.

3. The method of claim 2 further comprising:
   encapsulating each packet of the data in a TCP/IP packet for transmission in the transmitting operations.

4. The method of claim 1 further comprising:
   initiating creation of a third TCP session in each of the FCIP circuits, wherein a control data stream is designated for transmission over the third TCP session.

5. The method of claim 4 further comprising:
   transmitting the control data stream over the third TCP session.

6. The method of claim 5 comprising:
   encapsulating each packet of the control data stream in a TCP/IP packet for transmission in the operation of transmitting the control data stream.

7. The method of claim 1 wherein each FCIP circuit further maintains a TCP session designated for a control data stream.

8. The method of claim 1 further comprising:
   creating a virtual E_PORT acting as an endport for a local InterSwitch Link between two Fibre Channel networks over the tunnel.

9. The method of claim 1 wherein each TCP session includes its own TCP stack and settings for priority of service.

10. The method of claim 1 wherein each TCP session includes its own TCP stack and settings for VLAN tagging.

11. An Internet Protocol (IP) device comprising:
    a Fibre Channel (FC) port for receiving FC frames;
    a tunnel manager coupled to the FC port for initiating creation of a tunnel and for initiating creation of a TCP trunk containing two or more Fibre Channel over IP (FCIP) circuits in the tunnel; and
    an Ethernet port for receiving the FC frames, the Ethernet port being coupled to the tunnel manager and FC port and including an Transmission Control Protocol/Internet Protocol (TCP/IP) interface configured to initiate creation, in each of the FCIP circuits, of two or more Transmission Control Protocol (TCP) sessions and to designate data having a first priority of service for transmission over a first of the TCP sessions and data having a second priority of service for transmission over a second of the TCP sessions.

12. The IP device of claim 11 wherein the TCP/IP interface is further configured to transmit the data having the first priority of service over the first TCP session and to transmit the data having the second priority of service over the second TCP session.

13. The IP device of claim 12 where the TCP/IP interface is further configured to encapsulate each packet of the data in a TCP/IP packet for transmission in the transmitting operations.

14. The IP device of claim 11 wherein the TCP/IP interface is further configured to initiate creation of a third TCP session in each of the FCIP circuits, the third TCP session being designated for a control data stream.

15. The IP device of claim 14 wherein the TCP/IP interface is further configured to transmit the control data stream over the third TCP session.

16. The IP device of claim 15 wherein the TCP/IP interface is further configured to encapsulate each packet of the control data stream in a TCP/IP packet for transmission in the operation of transmitting the control data stream.

17. The IP device of claim 11 wherein each FCIP circuit further maintains a TCP session designated for a control data stream.

18. The IP device of claim 11 wherein the Ethernet port further creates a virtual E_PORT that acts as an endport for a local InterSwitch Link between the two Fibre Channel networks over the tunnel.

19. The IP device of claim 11 wherein each TCP session includes its own TCP stack and settings for priority of service.

20. The IP device of claim 11 wherein each TCP session includes its own TCP stack and settings for VLAN tagging.

21. A system comprising:
a first Internet Protocol (IP) device configured to receive Fibre Channel (FC) frames; and
a second IP device coupled to the first IP device over an IP network, wherein the first IP device is configured to initiate creation of a tunnel over the IP network between the first IP device and the second IP device, to initiate creation of a TCP trunk containing two or more Fibre Channel over IP (FCIP) circuits in the tunnel, and to initiate creation of two or more (Transport Control Protocol) TCP sessions in each of the FCIP circuits, at least two of the TCP sessions in each of the FCIP circuits being designated for data streams having different priorities of service.

22. The system of claim 21 wherein the first and second IP devices are configured to encapsulate each received FC frame in an IP packet and a TCP segment.

23. The system of claim 21 wherein each IP device is configured to transmit encapsulated FC frames to the other IP device over the tunnel.

24. The system of claim 21 wherein at least one of the TCP sessions is designated for a control data stream.

25. The system of claim 24 wherein the each IP device is configured to encapsulate a packet of the control data stream in an IP packet and a TCP segment.

26. The system of claim 25 wherein each IP device is configured to transmit encapsulated control data stream packets to the other IP device over the tunnel.

27. The system of claim 21 wherein each FCIP circuit further maintains a TCP session designated for a control data stream.

28. The system of claim 21 wherein the first IP device creates a virtual E_PORT that acts as an endport for a local InterSwitch Link between the first IP device and the second IP device over the IP network.

29. The system of claim 21 wherein each TCP session includes its own TCP stack and settings for priority of service.

30. The system of claim 21 wherein each TCP session includes its own TCP stack and settings for VLAN tagging.

* * * * *